(12) United States Patent
Onagawa

(10) Patent No.: US 7,042,524 B2
(45) Date of Patent: May 9, 2006

(54) VIDEO DATA CORRECTION DEVICE AND VIDEO DATA CORRECTION METHOD

(75) Inventor: Seiki Onagawa, Tokyo (JP)

(73) Assignee: NEC Corporation, Tokyo (JP)

( * ) Notice: Subject to any disclaimer, the term of this patent is extended or adjusted under 35 U.S.C. 154(b) by 790 days.

(21) Appl. No.: 09/984,454

(22) Filed: Oct. 30, 2001

(65) Prior Publication Data

US 2002/0051090 A1   May 2, 2002

(30) Foreign Application Priority Data

Oct. 31, 2000 (JP) .............................. 2000-332237

(51) Int. Cl.
 H04N 5/57  (2006.01)
 H04N 5/14  (2006.01)
 H04N 9/68  (2006.01)
 H04N 5/228  (2006.01)

(52) U.S. Cl. ................... 348/687; 348/673; 348/222.1; 348/238

(58) Field of Classification Search ............. 348/226.1, 348/254, 222.1, 295, 255, 619, 620, 669, 348/670, 678, 687, 238; 382/374; 345/77
See application file for complete search history.

(56) References Cited

U.S. PATENT DOCUMENTS 5,737,032 A * 4/1998 Stenzel et al. .............. 348/649
5,808,697 A * 9/1998 Fujimura et al. ........... 348/672
6,130,723 A * 10/2000 Medin ........................ 348/607
6,819,713 B1 * 11/2004 Sato ...................... 375/240.12

FOREIGN PATENT DOCUMENTS

| JP | 3-158077 | | 7/1991 |
|----|----------|---|--------|
| JP | 5-122551 | | 5/1993 |
| JP | 8-154188 | | 6/1996 |
| JP | 10145670 A | * | 5/1998 |
| JP | 10-155162 | | 6/1998 |
| JP | 2000-181434 | | 6/2000 |

* cited by examiner

Primary Examiner—Lin Ye
(74) Attorney, Agent, or Firm—Sughrue Mion, PLLC

(57) ABSTRACT

An average luminance calculation section 7 calculating an average luminance of video data to output an average luminance level, latches 8 to 10 delaying said average luminance levels by one-frame portion respectively to output them, a LUT 2 outputting a pre-set maximum correction factor e when the video data is input, correction factor calculation sections 3 to 6, adders 11 and 12, and a multiplier 12 are provided, each of the correction factor calculation sections compares the corresponding average luminance level out of the average luminance levels, which were output, with a plurality of correction thresholds respectively to carry out weighting of the maximum correction factor e responding to the comparison result and to output it as each correction factor, and simultaneously the adders 11 and 11, and the multiplier 12 correct the luminance level of the video data based on the average value of these correction factors.

12 Claims, 5 Drawing Sheets

VIDEO DATA CORRECTION DEVICE AND VIDEO DATA CORRECTION METHOD

BACKGROUND OF THE INVENTION

The present invention relates to a video data correction device and a video data correction method, which make correction for a luminance component of video data that was input.

A monitor (display section) for use in a computer device has the characteristic that the video being displayed is dark (luminance is low) as a whole because the distance between a user and the monitor is short as compared with the monitor for use in television. For this reason, in the event of displaying video contents formed for the television by means of the computer device, in order to improve visibility of the dark area for the luminance component of the video data, a correction process for the luminance component has been requested.

FIG. 8 is a block diagram illustrating one example of such a video data correction device. The video data correction device 100 comprises a dark area frequency counter 101, a LUT selection section 102, and a LUT conversion section 103. The dark area frequency counter 101 counts the appearance frequency of the dark area for the video data, of which the luminance level is below the specified one. The LUT selection section 102 selects the LUT, which is used for the luminance component correction for the video data, based on the appearance frequency of the dark area calculated by the dark area frequency counter 101. The LUT conversion section 103, which includes a plurality of LUTs #1 to #n in the inside thereof, employs the LUT selected by the LUT selection section 102 to carry out the correction of the luminance component for the video data.

But, in the conventional video data correction device, existed the task that the device became large in scale because it included a plurality of the LUTs so as to carry out the correction of the luminance component.

Also, since the conventional video data correction device carried out the correction for the luminance component of the video data, based on the appearance frequency of the dark area within one frame, the task also existed: In the event that the appearance frequency of the dark area in the video data frequently went up and down in the vicinity of a set correction threshold, a flicker occurred to the video display.

SUMMARY OF THE INVENTION

Accordingly, the objective of the present invention is to reduce the flicker of the video display in the event of correcting the luminance component of the video data, and simultaneously to intend downsizing of the device.

In order to solve such tasks, in the present invention, were provided: an average luminance calculation section that, every time one frame's video data was input, calculated the average luminance of the video data, which was input, and output it as an average luminance level; a delay section delaying by one-frame portion the average luminance level that was output from the average luminance calculation section; a table section (LUT 2) that, when the video data was input, output a maximum correction factor value, which was input,; a first correction factor calculation section (3) that compared a plurality of the correction thresholds, which differed in pre-set value, with the average luminance level from the average luminance calculation section, carried out weighting of said maximum correction factor value responding to the comparison result, and output it as a first correction factor value; a second correction factor calculation section that compared a plurality of the correction thresholds with the average luminance level from the delay section, carried out weighting of the maximum correction factor value responding to the comparison result, and output it as a second correction factor value; and a correction section that calculated the average value of the first and second correction factor values and simultaneously corrected said luminance level of the video data based on the calculated average value.

Also, as the delay section, a plurality of delay circuits (latch 8 to 10) were provided that delay the average luminance levels sequentially, which were output from said average luminance calculation section, one-frame portion by one-frame portion, and the second correction factor calculation was configured of a plurality of the correction factor calculation sections (4 to 6) provided responding to a plurality of the delay circuits, which compared the average luminance levels from a plurality of the delay circuits with a plurality of the correction thresholds respectively, carried out weighting of said maximum correction factor value responding to the comparison results, and output them as the correction factor values respectively.

Also, a threshold correction section was provided that, when a plurality of the correction thresholds were input, selected two correction thresholds from a plurality of the correction thresholds, which were input, calculated the average value of the selected correction thresholds, and simultaneously output the calculated average value and a plurality of the correction thresholds that were input, the first correction factor calculation section compares a plurality of the correction thresholds and the average value from the threshold correction section with the average luminance level from the average luminance calculation section, carries out weighting of the maximum correction factor value responding to the comparison result, and outputs it as a first correction factor value, and the second correction factor calculation section compares a plurality of the correction thresholds and the average value from the threshold correction section with the average luminance level from the delay section, carries out weighting of the maximum correction factor value responding to the comparison result, and outputs it as a second correction factor value.

Also, the average luminance calculation section was configured of an accumulator (71) adding the luminance component values of one frame portion's video data cumulatively, based on a pixel clock and a vertical synchronizing signal of the video data, and a multiplier (72) that, when the cumulative additional value from the accumulator was input, multiplied this cumulative additional value by the inverse of the number of the pixels in the video data within one frame, calculated the average value of the luminance component of the video data, and output it as an average luminance level.

Also, each of the first and second correction factor calculation sections were configured of a plurality of comparators (31 to 34) comparing size of the average luminance level, which was input, with a plurality of the correction thresholds respectively to decide height of the average luminance level, a decoder (35) outputting a multiplication factor of the value that corresponded to height of the average luminance level decided by the comparators, and a multiplier (36) multiplying the maximum correction factor value from the table section by the multiplication factor from said decoder, of which the value increased as the average luminance level lowered, to output this multiplication result as a correction factor.

Also, the correction section was configured of a first adder (11) adding the first and the second correction factor values, a multiplier (12) calculating the average value of the first and the second correction factor values from the additional value added by the first adder, and a second adder (13) adding the average data from the multiplier to the video data.

BRIEF DESCRIPTION OF THE DRAWING

This and other objects, features and advantages of the present invention will become more apparent upon a reading of the following detailed description and drawings, in which.

DESCRIPTION OF THE EMBODIMENTS

Hereinafter, the present invention will be explained in reference to the accompanied drawings.

First Embodiment

Figure 1:
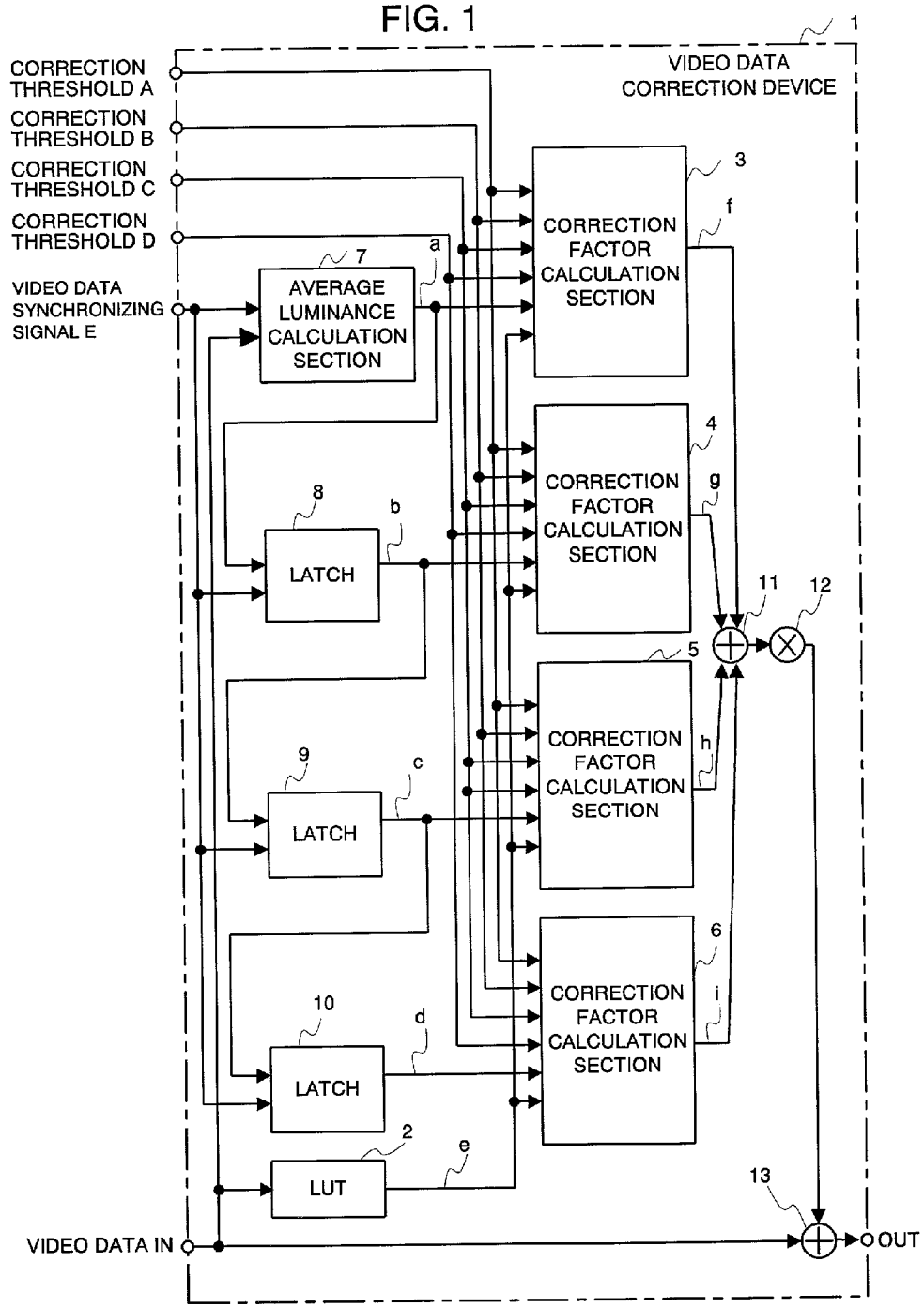
FIG. 1 is a block diagram illustrating a first embodiment of a video data correction device relating to the present invention.

FIG. 1 is a block diagram illustrating a first embodiment of a video data correction device of the present invention. This video data correction device 1, as shown in FIG. 1, comprises a LUT (Look Up Table) 2, correction factor calculation sections 3 to 6, an average luminance calculation section 7, latches 8 to 10, adders 11 and 13, and a multiplier 12.

Herein, at the time of reading out input video data IN, the video data value is treated as an address, and the LUT 2 is one that outputs a pre-set maximum correction factor value e every time the video data IN is input.

Also, the average luminance calculation section 7 is a section that inputs the synchronizing signal E of the video data IN and the video data IN, calculates the average value of the luminance component of the video data within one frame every vertical synchronizing signal, and generates average luminance level data a.

Also, each of the latch 8, the latch 9, and the latch 10 is one that receives the synchronizing signal (vertical synchronizing signal) E of the video data IN, delays the average luminance level data a calculated by the average luminance calculation section 7 every vertical synchronizing signal E, and generates average luminance level data b, average luminance level data c and average luminance level data d respectively.

Further, the correction factor calculation section 3 is a section that compares the average luminance level data a with a correction threshold A, a correction threshold B, a correction threshold C and a correction threshold D, and simultaneously carries out weighting for the maximum correction factor value e input from the LUT 2 responding to the result of said comparison, and outputs a correction factor f. Also, the correction factor calculation section 4 is a section that compares the average luminance level data b with the correction threshold A, the correction threshold B, the correction threshold C and the correction threshold D in a similar way to the correction factor calculation section 3, and simultaneously carries out weighting for the maximum correction factor value e input from the LUT 2 responding to the result of said comparison, and outputs it as a correction factor g. Also, the correction factor calculation section 5 is a section that compares the average luminance level data c with the correction threshold A, the correction threshold B, the correction threshold C and the correction threshold D in a similar way to the correction factor calculation section 3, and simultaneously carries out weighting for the maximum correction factor value e input from the LUT 2 responding to the result of said comparison, and outputs it as a correction factor h. Further, the correction factor calculation section 6 is a section that compares the average luminance level data d with the correction threshold A, the correction threshold B, the correction threshold C and the correction threshold D in a similar way to the correction factor calculation section 3, and simultaneously carries out weighting for the maximum correction factor value e input from the LUT 2 responding to the result of said comparison, and outputs it as a correction factor i.

Also, the adder 11 adds the correction factor f, the correction factor g, the correction factor h and the correction factor i output from each of the correction factor calculation sections 3, 4, 5 and 6 respectively to output the additional value to the multiplier 12. The multiplier 12 multiplies the additional value input from the adder 11 by a pre-set value to output it as a real correction factor value to the adder 13. The adder 13 is one that adds the real correction factor value from the adder 12 to the input video data IN to output it as video data OUT of which the luminance component was corrected.

In such a manner, the present video data correction device 1 is a device adapted to delay by plural frames' time portion the average luminance level a of the input video data IN calculated by the average luminance calculation section 7 by means of the latch 8, the latch 9 and the latch 10, to calculate the correction factors f to i based on respective delayed values, to make correction for the input video data IN by the average value (said real correction factor value) of the correction factors f to i of the plural frames' portion, and to correct the luminance component of the video data IN. Thereby, also in the event that the average luminance level of the video data IN goes up and down in the vicinity of the correction threshold, the correction value of the luminance component does not follow it abruptly, and accordingly a flicker on the video display due to abrupt fluctuation of the correction value of the luminance component can be reduced.

Figure 2:
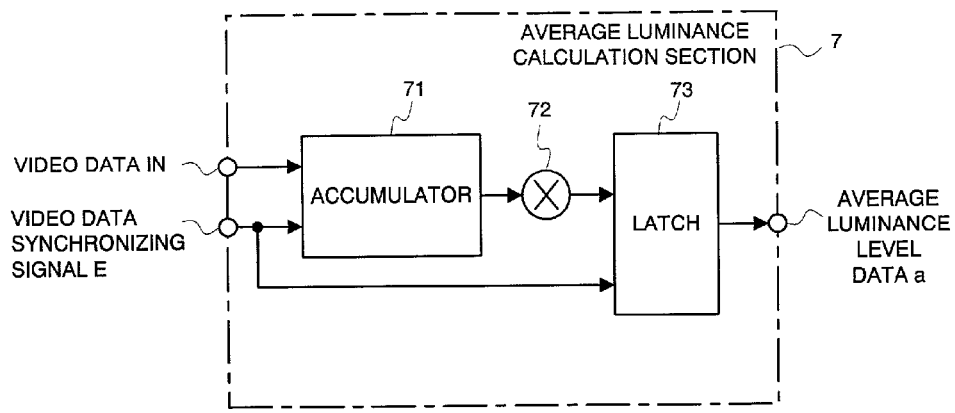
FIG. 2 is a block diagram of an average luminance calculation section constituting said video data correction device.

Next, the detailed configuration of said average luminance calculation section 7 within the video data correction device 1 will be explained in reference to FIG. 2. The average luminance calculation section 7, as shown in FIG. 2, can be configured by combination of an accumulator 71, a multiplier 72 and a latch 73.

The accumulator 71 cumulatively adds the luminance component values of the video data IN based on the pixel clock and the vertical synchronizing signal E of the input video data IN, and outputs this additional value to the multiplier 72. Herein, the cumulative additional value is reset by the vertical synchronizing signal E of the input video data IN.

The multiplier 72 multiplies the cumulative additional value from the accumulator 71 by a pre-set value. Herein, by setting said multiplication value, which is pre-set, for example, at the inverse of the number of pixels in the video data within one frame, the multiplication result, which is output from the multiplier 72, becomes the average value of the luminance component in the video data IN within one frame. Based on the synchronizing signal E of the video data IN, the latch 73 latches by one-frame time the output value from the multiplier 72 just before the cumulative additional value of the accumulator 71 is reset. Thereby, the average luminance calculation section 7 can output the average luminance level a, which is updated every vertical synchronizing signal E, from the synchronizing signal E of the video data and the video data IN.

Next, the detailed configuration of each of the correction factor calculation sections 3 to 6 within the video data correction device 1 will be explained. These correction factor calculation sections 3 to 6 can be realized by combination of, for example, a comparator, a decoder and a multiplier.

Figure 3:
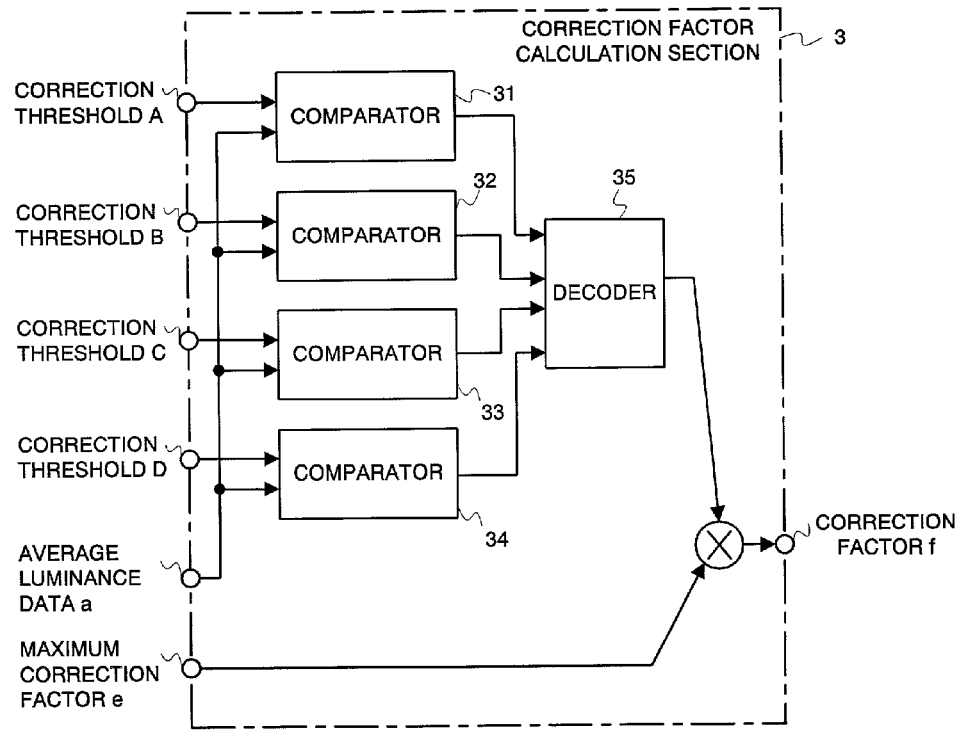
FIG. 3 is a block diagram of a correction factor calculation section constituting said video data correction device.

FIG. 3 is a block diagram illustrating a configuration of the correction factor calculation section 3 out of the correction factor calculation sections 3 to 6. The other correction factor calculation sections 4 to 6 are configured in a similar manner to the correction factor calculation section 3. The correction factor calculation section 3, as shown in FIG. 3, is configured of comparators 31 to 34, a decoder 35 and a multiplier 36.

Each of the comparator 31, the comparator 32, the comparator 33, and the comparator 34 compares the correction threshold value A, the correction threshold value B, the correction threshold value C and the correction threshold value D respectively with the average luminance level data a to output the comparison results to the decoder 35. The decoder 35 receives respective comparison results from the comparator 31, the comparator 32, the comparator 33 and the comparator 34 to output to the multiplier 36 multiplication factors that corresponded to the respective comparison results. That is, the higher is the average luminance level, the decoder 35 outputs the multiplication factor with the smaller value, and simultaneously the lower is the average luminance level, it outputs the multiplication factor with the larger value. The multiplier 36 multiplies the maximum correction factor e input from the LUT 2 by the multiplication factor from the decoder 35 to output it as a factor f. Thereby, the higher is the average luminance level of the input video data IN, the factor f becomes the smaller value, and the lower is the average luminance level, it becomes the larger value.

Herein, if size relation of the correction thresholds, which are input into the comparator 31, the comparator 32, the comparator 33 and the comparator 34, was set at the correction threshold A> the correction threshold B> the correction threshold C> the correction threshold D respectively, the multiplication factor, which is output from the decoder 35, is set, for example, as follows. That is:

The multiplication factor $0/4$ when the average luminance level data> the correction threshold A The multiplication factor $1/4$ when the average luminance level data> the correction threshold B The multiplication factor $2/4$ when the average luminance level data> the correction threshold C The multiplication factor $3/4$ when the average luminance level data> the correction threshold D;

Else, the multiplication factor $4/4$.

Thereby, as the correction factor f that is output from the correction factor calculation section 3, the value weighted by fluctuation of the average luminance level data is output.

Figure 4A:
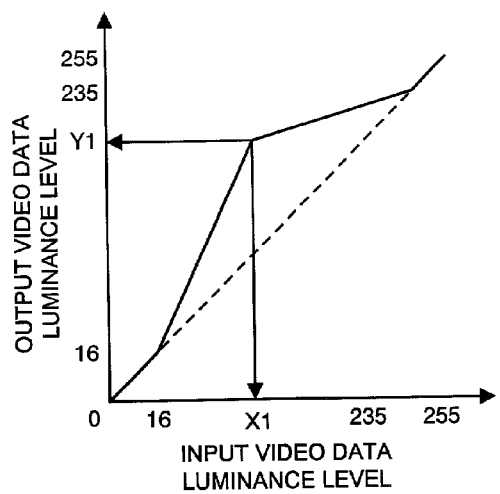
FIGS. 4A and 4B are graphs illustrating a correction situation of a luminance level of input video data.
Figure 4B:
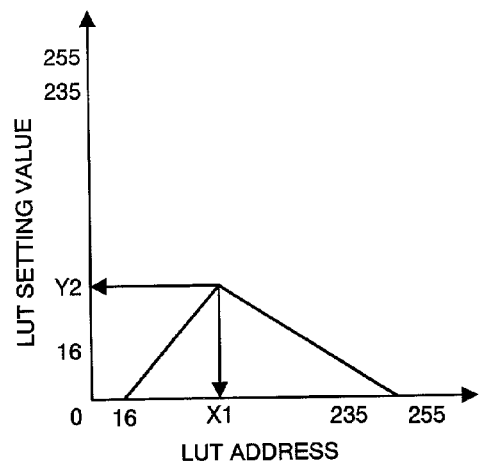
Figure 5:
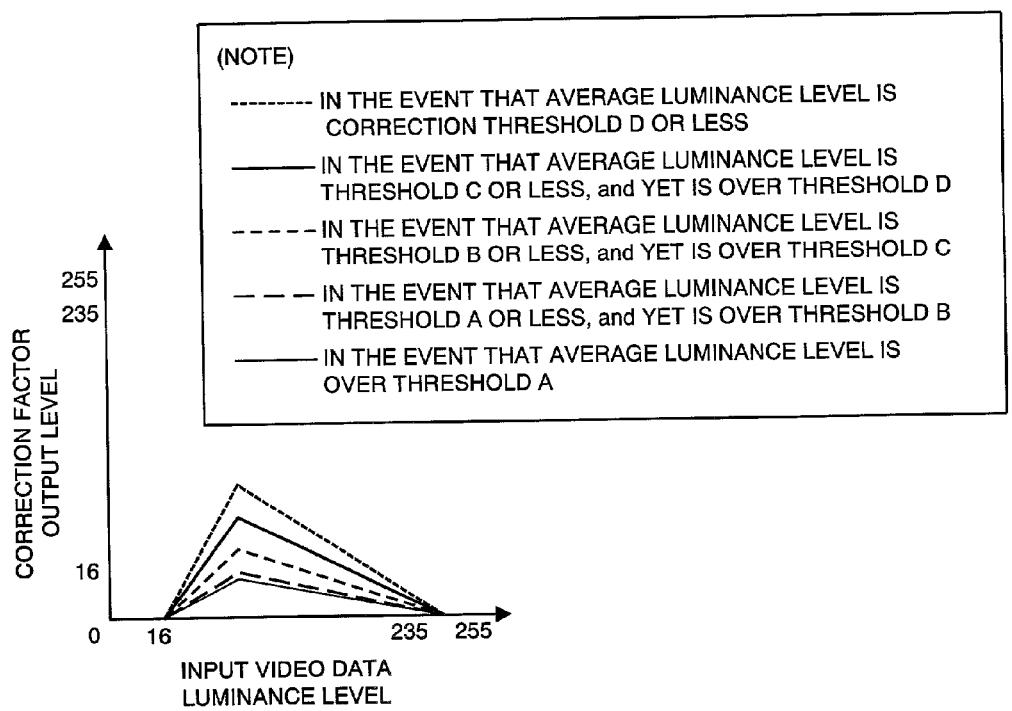
FIG. 5 is a graph illustrating relation between the luminance level of the input video data and a correction factor.

Next, the main part of the video data correction device 1 configured in a manner described above will be further explained in details in reference to FIG. 1, FIG. 4 and FIG. 5.

Normally, the video data varies in average luminance level according to each scene within video contents. For example, if the scene is dark in the entirety of the screen, the average luminance level is low, and, to the contrary, if the scene is bright in the entirety of the screen, the average luminance level is high. In the present embodiment, in the event that the entirety of the screen is dark and the average luminance level is low, the correction is made for the luminance component of the video data by adding the correction value to the video data, and in the event that the entirety of the screen is bright and the average luminance level is high, the correction is not made.

FIG. 4A is a graph illustrating an example of the luminance level of the video data output after making correction for the luminance level of the input video data in the event that the average luminance level of the video data is recognized to be the darkest. Herein, the values of the level shown at a traverse axis and at a longitudinal axis in each graph of FIG. 4, and FIG. 5 to be described later indicate digital values of 0 to 255 in the event of having converted an analogue signal into an 8-bit digital signal, and show that the larger is the digital value, the higher is the level. In the graph shown in FIG. 4A, the degree of the correction for the dark part of the video data IN was increased. That is, in the event that the luminance level of the video data IN is low value X1 or less, it is output after correction into, for example, the video signal with the high luminance level like the value Y1 by means of increasing the correction factor value.

FIG. 4B is a graph illustrating an example of a setting value for the LUT 2 in the event of realizing the correction characteristic like FIG. 4A. In the LUT 2, only the additional value to the video data IN is set as said maximum correction factor e at the moment of making correction for the video data IN. Herein, when the video data IN with the luminance level of, for example, the value X1 is input into the LUT 2, the LUT 2 outputs as the correction value a setting value Y2 set in an address that corresponds to its value X1, as described earlier. As a result of adding this correction value Y2 to the input video data IN, the output video data with the luminance level Y1 shown in FIG. 4A is obtained.

By the way, for the video data IN, which is input into this device 1, as described earlier, the average luminance level a within one frame is calculated by the average luminance calculation section 7. The calculated average luminance level a is latched by each of the latch 8, the latch 9, and the latch 10 every one-frame period based on the vertical synchronizing signal E of the video data to obtain the average luminance level b, the average luminance level c, and the average luminance level d.

FIG. 5 is a graph illustrating relation between the luminance level of the video data IN in each of the correction factor calculation sections 3 to 6 and the correction factor calculated responding to this luminance level. Herein, in the present embodiment, size relation of the correction threshold A, the correction threshold B, the correction threshold C, and the correction threshold D was set at the correction threshold A> the correction threshold B> the correction threshold C> the correction threshold D, and the correction factors calculated by each of the correction factor calculation sections 3 to 6, as shown in FIG. 5, becomes the smallest when the average luminance level of the input video data IN is higher than the correction threshold A, and becomes the largest when the average luminance level of the input video data IN is lower than the correction threshold D. That is, the higher is the average luminance level of the input video data IN, said correction factor becomes the smaller value, and the lower is the average luminance level, it becomes the larger value.

Accordingly, the correction factor f, the correction factor g, the correction factor h, and the correction factor i that corresponded to the average luminance levels of the four continuous frames can be obtained by each of the correction factor calculation section 3, the correction factor calculation section 4, the correction factor calculation section 5, and the correction factor calculation section 6. If all theses correction factor values are added by the adder 11 and the added multiplication factor is multiplied by ¼ by means of the multiplier 12, the average value of the correction factors within the four continuous frames is obtained. In the adder 13, this average value of the four-frame portion's correction factors is added to the input video data IN, and is output as video data OUT after the correction.

Thus, since the average value of the average luminance levels within a plurality of frames was found and was set at the luminance correction factor for the video data, stable video display of which a flicker is small can be obtained also in the event that the average luminance level of the video data frequently goes up and down in the vicinity of the set correction threshold.

Also, the configuration was made so that only the maximum correction value (maximum correction factor e) was stored within the LUT 2 and the luminance component correction value was calculated from this maximum correction value according to variation in average luminance level of the video data, whereby it is not necessary to possesses the LUT for every representative value of the average luminance level, and accordingly since a plurality of the LUTs become needless, the device can be configured on a small scale.

Second Embodiment

Figure 6:
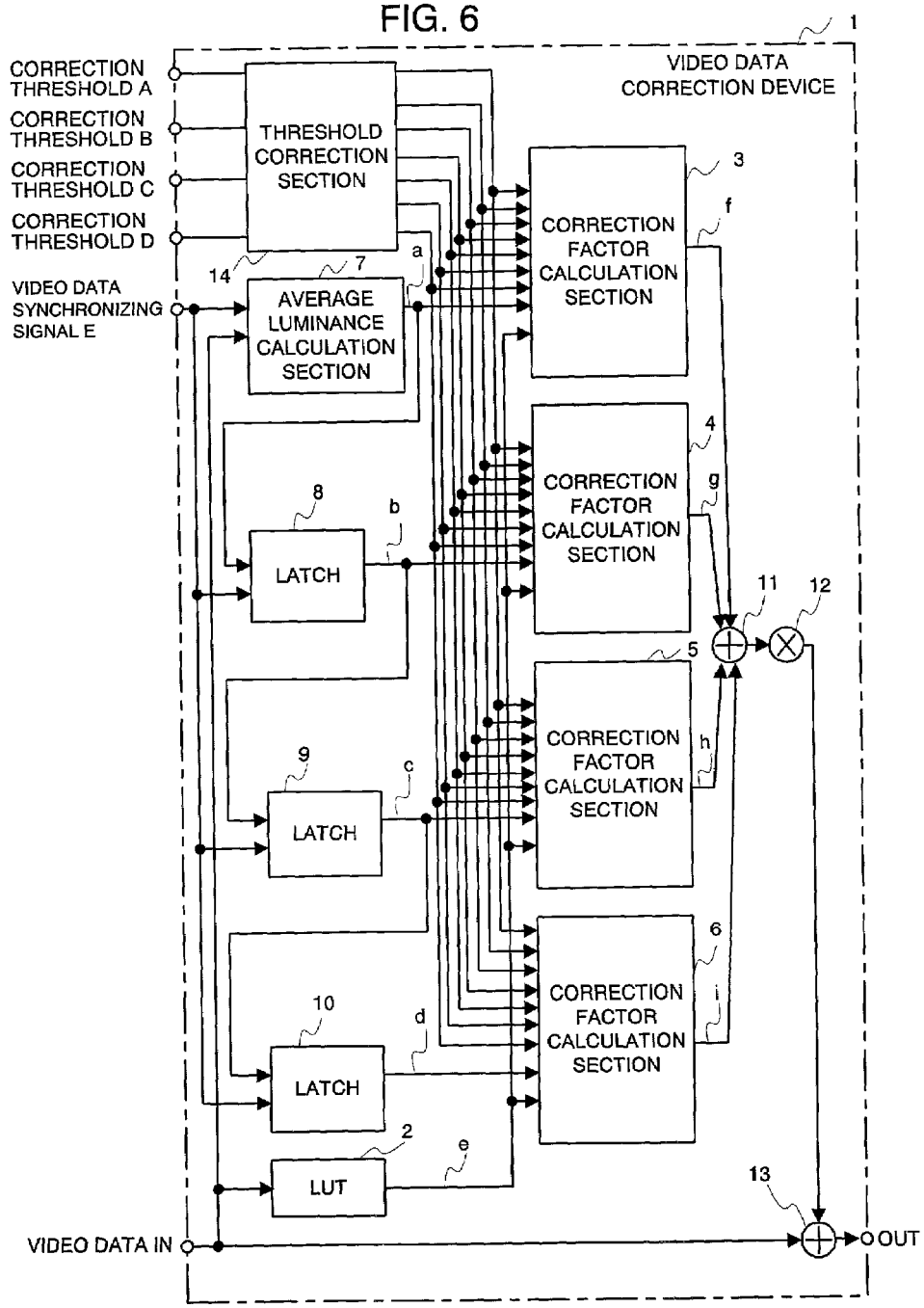
FIG. 6 is a block diagram illustrating a second embodiment of a video data correction device relating to the present invention.

FIG. 6 is a block diagram of the video data correction device illustrating a second embodiment of the present invention, wherein a threshold correction section 14 was provided in the video data correction device of the first embodiment shown in FIG. 1. The threshold correction section 14 is a section that inputs the four correction thresholds A to D, converts them, and outputs seven correction thresholds respectively to the correction factor calculation sections 3 to 6, as shown in FIG. 6.

Figure 7:
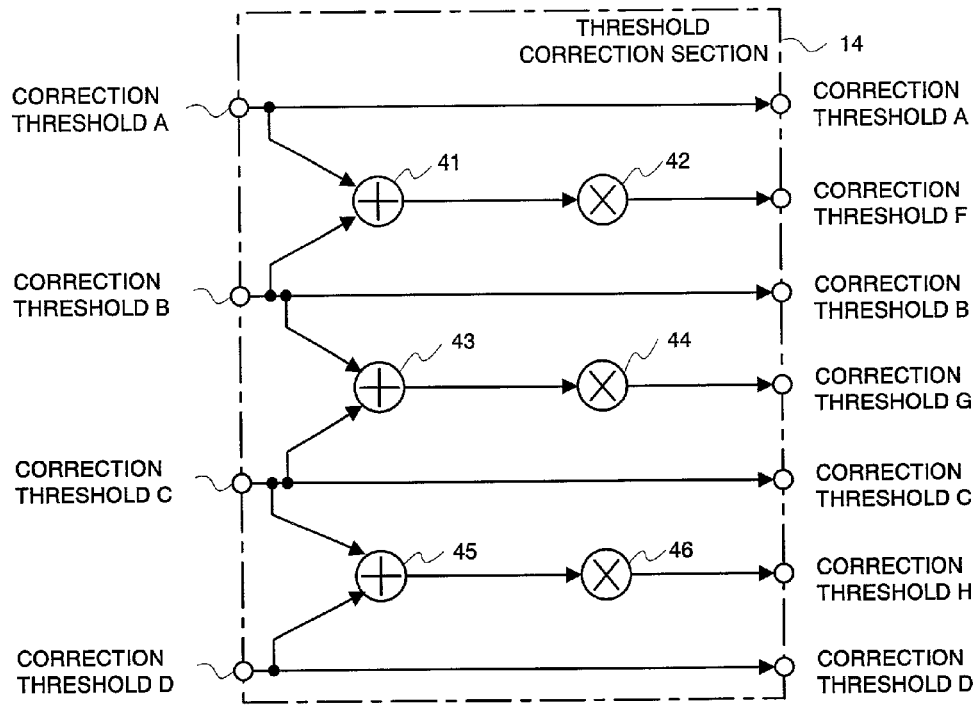
FIG. 7 is a block diagram illustrating a configuration of a threshold correction section provided in said video data correction device.
Figure 8:
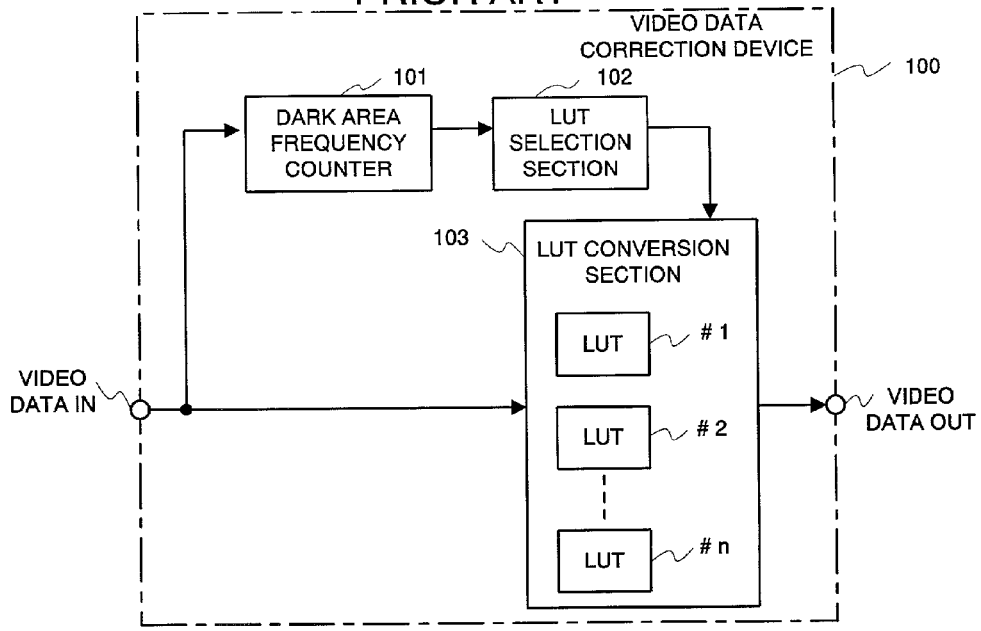
FIG. 8 is a block diagram of the conventional video data correction device.

FIG. 7 is a block diagram illustrating the detailed configuration of the threshold correction section 14. The threshold correction section 14, as shown in FIG. 7, is configured of an adder 41, a multiplier 42, an adder 43, a multiplier 44, an adder 45, and a multiplier 46. In the threshold correction section 14, the average value of the correction threshold A and the correction threshold B is calculated by the adder 41 and the multiplier 42, and a correction threshold F, which becomes the intermediate value of the correction threshold A and the correction threshold B, is output. Also, the average value of the correction threshold B and the correction threshold C is calculated by the adder 43 and the multiplier 44, and a correction threshold G, which becomes the intermediate value of the correction threshold B and the correction threshold C, is output. Further, the average value of the correction threshold C and the correction threshold D is calculated by the adder 45 and the multiplier 46, and a correction threshold H, which becomes the intermediate value of the correction threshold C and the correction threshold D, is output. Or else, the threshold correction section 14 outputs each of the correction thresholds A, B, C, and D, which were input, as they stand.

In the first embodiment shown in FIG. 1, if the maximum correction factor e is set to be large for the LUT 2, even though the average value of the correction factor is calculated by the adder 11 and the multiplier 12, fluctuation of the correction factor being supplied to the adder 13 becomes large in some cases, but in the second embodiment, by reducing a difference between the neighboring correction thresholds by the threshold correction section 14, fluctuation of the correction factor that is given to the adder 13 can be suppressed. Accordingly, abrupt fluctuation of the luminance component correction value can be suppressed further as compared with the first embodiment, whereby the stable video display of which a flicker is small can be obtained.

In the first and second embodiments, the configuration was made so that the average luminance level a calculated by the average calculation section 7 was delayed by one-frame portion by the latch 8, was output as the average luminance level b, yet was delayed by two-frame portion by the latch 9, was output as the average luminance level c, simultaneously was further delayed by three-frame portion by the latch 10, and was output as the average luminance level d. That is, the configuration was made so that, at the time when the average luminance calculation section 7 input new video data IN, calculated the average luminance and output it to the correction factor calculation section 3, the latch 8 output to the correction factor calculation section 4 the average luminance level of the video data that was one frame ahead of its video data IN, the latch 9 output to the correction factor calculation section 5 the average luminance level of the video data that was two frames ahead of its video data IN, and simultaneously the latch 10 output to the correction factor calculation section 6 the average luminance level of the video data that was three frames ahead of its video data IN.

In such a case, even though the configuration was made so that: only the average luminance calculation section 7 and the latch 8 were provided; when the average luminance calculation section 7 input new video data IN, calculated the average luminance and output it to the correction factor calculation section 3, the latch 8 was caused to output to the correction factor calculation section 4 the average luminance level of the video data that was one frame ahead of its video data IN; each of the correction factor calculation sections 3 and 4 calculated the correction factor based on the average luminance level, which was input, and output them as the correction factors f and g to the adder 11; the adder 11 added these; simultaneously the multiplier 12 calculated the average value of each of the correction factors f and g; and the adder 13 added said average value to the video data IN to output it as the video data OUT, the stable video display of which a flicker is small can be obtained. By employing such a configuration, the latches 9 and 10, and the correction factor calculation sections 5 and 6 can be spared.

In accordance to the present invention as explained above, were provided: the average luminance calculation section that, every time one frame's video data was input, calculated the average luminance of the video data that was input, and output it as the average luminance level; the delay section delaying by one-frame portion the average luminance level that was output from the average calculation section; the table section outputting the pre-set maximum correction factor value when the video data was input; and the first and second correction factor calculation sections, wherein the first correction factor calculation section compared a plurality of the pre-set correction thresholds, which differed in value respectively, with the average luminance level from the average luminance calculation section, carried out weighting of the maximum correction factor value responding to the comparison result and output it as the first correction factor, and wherein simultaneously the second correction factor calculation section compared a plurality of the correction thresholds with the average luminance level from the delay section, carried out weighting of the maximum correction factor value responding to the comparison result and output it as the second correction factor, and wherein the average value of the first and second correction factor values, which were output, was calculated to correct the luminance level of said video data based on the calculated average value, whereby, also in the event that the average luminance level of the video data frequently goes up and down in the vicinity of the set correction threshold, stable video display of which a flicker is small can be obtained, and simultaneously it is acceptable to provide within the device only one table in which the maximum correction factor value was set, and accordingly the device can be configured on a small scale.

The entire disclosure of Japanese Application No. 2000-332237 filed Oct. 31, 2000 including specification, claims, drawings and summary are incorporated herein by reference in its entirely.

What is claimed is:

1. A video data correction device comprising:
   every time one frame's video data is input, an average luminance calculation section calculating an average luminance of video data, which was input, to output it as an average luminance level;
   a delay section delaying by one-frame portion said average luminance level that is output from said average luminance calculation section;
   when said video data is input, a table section outputting a pre-set maximum correction factor value;
   a first correction factor calculation section comparing a plurality of correction thresholds, which differ in pre-set value, with said average luminance level from said average luminance calculation section to carry out weighting of said maximum correction factor value responding to a comparison result and to output it as a first correction factor value;
   a second correction factor calculation section comparing said plurality of said correction thresholds with said average luminance level from said delay section to carry out weighting of said maximum correction factor value responding to a comparison result, and to output it as a second correction factor value; and
   a correction section calculating an average value of said first and second correction factor values and simultaneously correcting said luminance level of said video data based on said calculated average value.

2. The video data correction device according to claim 1, wherein said delay section was configured of a plurality of delay circuits delaying said average luminance levels sequentially, which were output from said average luminance calculation section, one-frame portion by one-frame portion, and
   wherein said second correction factor calculation section was configured of a plurality of correction factor calculation sections that are provided responding to a plurality of said delay circuits, said plurality of said correction factor calculation sections comparing said average luminance levels from said plurality of said delay circuits with said plurality of said correction thresholds respectively to carry out weighting of said maximum correction factor value responding to a comparison result respectively, and to output them as correction factor values.

3. The video data correction device according to claim 1, wherein, a threshold correction section is provided that, when a plurality of the correction thresholds are input, selects two correction thresholds from a plurality of said correction thresholds, which were input, calculates an average value of said selected correction thresholds, and simultaneously outputs said calculated average value together with said plurality of said correction thresholds that were input, and
   wherein said first correction factor calculation section compares said plurality of said correction thresholds and said average value from said threshold correction section with said average luminance level from said average luminance calculation section, carries out weighting of said maximum correction factor value responding to a comparison result, and outputs it as a first correction factor value, and
   wherein said second correction factor calculation section compares said plurality of said correction thresholds and said average value from said threshold correction section with said average luminance level from said delay section, carries out weighting of said maximum correction factor value responding to a comparison result, and outputs it as a second correction factor value.

4. The video data correction device according to claim 1, wherein said average luminance calculation section is configured of;
   an accumulator adding luminance component values of one-fame portion's video data cumulatively, based on a pixel clock and a vertical synchronizing signal of said video data; and
   when said cumulative additional value from said accumulator is input, a multiplier multiplying this cumulative additional value by an inverse of number of pixels in said video data within one frame to calculate an average value of said luminance components of said video data and to output it as said average luminance level.

5. The video data correction device according to claim 1, wherein said first and second correction factor calculation sections are configured of:
   a plurality of comparators comparing size of said average luminance level, which was input, and a plurality of said correction thresholds respectively to decide height of said average luminance level;
   a decoder outputting a multiplication factor of value that corresponded to height of said average luminance levels decided by said comparator; and a multiplier multiplying said maximum correction factor value from said table section by said multiplication factor from said decoder, of which value increases as said average luminance level lowers, to output this multiplication result as a correction factor.

6. The video data correction device according to claim 1, wherein said correction section is configured of:

a first adder adding said first and second correction factor values;

a multiplier calculating an average value of said first and second correction factor values from said additional value added by said first adder; and a second adder adding said average data from said multiplier to said video data.

7. A video data correction method, comprising:

every time one frame's video data is input, a first step of calculating an average luminance of video data, which was input, to output it as an average luminance level;

a second step of delaying by one-frame portion said average luminance level calculated based on a process of said first step;

a third step of outputting a pre-set maximum correction factor value when said video data is input;

a fourth step of comparing a plurality of correction thresholds, which differ in pre-set value, with said average luminance level calculated based on said process of said first step to carry out weighting of said maximum correction factor value responding to a comparison result and to output it as a first correction factor value;

a fifth step of comparing said plurality of said correction thresholds with said average luminance level based on said process of said second step to carry out weighting of said maximum correction factor value responding to a comparison result, and to output it as a second correction factor value; and a sixth step of calculating an average value of said first and second correction factor values and simultaneously correcting said luminance level of said video data based on said calculated average value.

8. The video data correction method according to claim 7, wherein said process in said second step includes a seventh step of sequentially delaying said average luminance level calculated based on said process of said first step one-frame portion by one-frame portion, and wherein said process in said fifth step includes an eighth step of comparing said plurality of said correction thresholds with each of said average luminance levels delayed based on said process of the said seventh step respectively to carry out weighting of said maximum correction factor value responding to a comparison result respectively, and to output them as correction factor values.

9. The video data correction method according to claim 7, further comprising a ninth step of, when a plurality of said correction thresholds are input, selecting two correction thresholds from said plurality of said correction thresholds, which were input, to calculate an average value of said selected correction thresholds, and simultaneously to output a calculated average value together with said plurality of said correction thresholds that were input, wherein a process in said fourth step includes a tenth step of comparing said plurality of said correction thresholds and said average value based on said process of said ninth step with said average luminance level calculated based on said process of said first step to carry out weighting of said maximum correction factor value responding to a comparison result, and to output it as a first correction factor value, and wherein a process in said fifth step includes an eleventh step of comparing said plurality of said correction thresholds based on said process of said ninth step and said average value with said average luminance level based on said process of said second step to carry out weighting of said maximum correction factor value responding to a comparison result, and to output it as a second correction factor value.

10. The video data correction method according to claim 7, wherein said process in said first step includes:

a twelfth step of cumulatively adding said luminance component values of one-fame portion's video data, based on a pixel clock and a vertical synchronizing signal of said video data; and when said cumulative additional value based on said process of said twelfth step is input, a thirteenth step of multiplying this cumulative additional value by an inverse of number of pixels in said video data within one frame to calculate an average value of said luminance component of said video data and to output it as an average luminance level.

11. The video data correction method according to claim 7, wherein said processes in said fourth and fifth steps include:

a fourteenth step of comparing size of said average luminance level, which was input, and said plurality of said correction thresholds respectively to decide height of said average luminance level;

a fifteenth step of outputting a multiplication factor of value that corresponded to height of said average luminance levels decided based on said process of said fourteenth step; and a sixteenth step of multiplying said maximum correction factor value by said multiplication factor based on said process of said fifteenth step, of which value increases as said average luminance level lowers, to output this multiplication result as a correction factor.

12. The video data correction method according to claim 7, wherein said process in said sixth step includes:

a seventeenth step of adding said first and second correction factor values;

an eighteenth step of calculating an average value of said first and second correction factor values from said additional value based on the process of said seventeenth step; and a nineteenth step of adding said average data based on said process of said eighteenth step to said video data.

* * * * *